United States Patent [19]

Deschuytere

[11] Patent Number: 5,758,042
[45] Date of Patent: May 26, 1998

[54] LOSSY AND LOSSLESS COMPRESSION IN RASTER IMAGE PROCESSOR

[75] Inventor: Frank André Deschuytere, Beveren, Belgium

[73] Assignee: Agfa-Gevaert, N.V., Mortsel, Belgium

[21] Appl. No.: 647,167

[22] Filed: May 9, 1996

Related U.S. Application Data

[62] Division of Ser. No. 271,369, Jul. 6, 1994, Pat. No. 5,552,898.

[51] Int. Cl.⁶ .............. G06K 15/02; G06T 9/00; H04N 1/415
[52] U.S. Cl. .............. 395/114; 382/180; 382/234; 382/239; 382/244; 382/250
[58] Field of Search .............. 395/114; 382/180, 382/234, 239, 244, 250, 248; 358/426, 432, 433, 429

[56] References Cited

U.S. PATENT DOCUMENTS

| | | | |
|---|---|---|---|
| 5,504,842 | 4/1996 | Gentile | 395/114 |
| 5,506,944 | 4/1996 | Gentile | 395/114 |
| 5,539,865 | 7/1996 | Gentile | 395/114 |
| 5,544,290 | 8/1996 | Gentile | 395/114 |

*Primary Examiner*—Scott Rogers
*Attorney, Agent, or Firm*—Baker & Botts, L.L.P.

[57] ABSTRACT

Digital input commands defined in a page description language are separated in two types of instructions: first instructions resulting in solid regions on the printed output and second instructions resulting in halftoned regions. The first instructions generate a binary bitmap indicating a high or low density of the solid regions and a binary bitmask indicating whether recorder elements belong to a solid or screened region. The bitmap and bitmask are preferentially compressed by a lossless compression method. The second type of instructions generate a contone map, representing images having contone levels and graphics having intermediate levels. The contone map is preferentially compressed by a lossy compression method, stored on a storage medium and retrieved once the output device must render the rasterized image. The rasterized image is constructed on the fly from the compressed bitmap, bitmask and contone map, which is halftoned before combination with the bitmap. A serious amount of memory can be saved, while keeping up with the speed of the rendering process in the output devise and without deteriorating the quality of the reproduction.

1 Claim, 1 Drawing Sheet

LOSSY AND LOSSLESS COMPRESSION IN RASTER IMAGE PROCESSOR

This is a division of application Ser. No. 08/271,369, filed on Jul. 6, 1994 now U.S. Pat. No. 5,552,898.

FIELD OF THE INVENTION

The present invention relates to devices and methods for converting streams of page description language into binary or multilevel bitmaps, for use in conjunction with real time printing devices for the reproduction of continuous tone colour or grey images, together with text and graphics. The method makes especially use of compression techniques.

BACKGROUND OF THE INVENTION

Electronic reproduction on output devices of continuous tone images, together with graphical information such as line art and characters, usually involves a step for the generation of a bitmap. If the output device is a binary system, capable to deposit at every addressable location a fixed amount of ink or nothing, a binary bitmap must be generated. Such binary bitmap can be seen as a rectangular array of elements, wherein each element corresponds to one addressable location or recorder element. Each element in the bitmap must be able to represent that ink must be deposit or not, and can therefore be represented by one bit, having e.g. a value 0 for ink, and 1 for no ink. If the resolution of the output device is 400 dpi (dots per inch) or about 16 dots per mm, and the maximal paper size is an A3 form, measuring 420 mm by 297 mm, such as for the AGFA XC305 and AGFA XC315 system, marketed by Agfa-Gevaert N.V. in Mortsel, Belgium, a bitmap covering such a form requires about 29 megabits of memory, or over 3.6 megabyte. Several output devices, such as the XC305 and XC315 systems, have multilevel or contone capabilities. This means that every recorder element can be rendered with intermediate density levels, between no ink deposit and full ink deposit. As such, the above mentioned systems accept eight bits per recorder element, such that a bitmap covers 29 megabytes of memory. Moreover, these output devices are capable to print with different coloured inks, and can print four inks (cyan, magenta, yellow and black) on top of each other on the same page, to reproduce a continuous colour image. The four corresponding bitmaps require nearly 120 megabytes of memory. Most of these output devices require that the data are delivered in real time to the printing engine. This means that the bitmaps must be pre-computed and stored in 120 megabytes of memory, or that the four bitmaps must be generated in real time, keeping up with the speed of the printing process of the output device. The first solution requires a huge amount of expensive memory. The second solution is not feasible for complex page layouts. For most output devices it is also not appropriate to stop the printing process between the printing of two colour components on top of each other. This is due to the fact that the paper on which the ink must be deposit is usually pre-conditioned to regulate its temperature and humidity. If the printing process is stopped for some tens of seconds, e.g. to compute the bitmap for the next colour component, the paper can take up additional humidity and swell, causing mis-registration of the next colour component with respect to the previous colour component. To avoid these problems, the cost of the mechanics of the printer would increase. Even if that problem were solved, a considerable amount of memory is necessary to store one full bitmap. As in photographic recorders, the bitmap could be computed in bands and every band could be printed once it is ready. But this causes tremendous problems for output devices working on the basis of an electrographic process. For such a process, the operational parameters for e.g. the toner brush are optimised such, that the system works best for a specific speed of the acceptor material, i.e. the photosensitive drum and the paper. This means that for most electrographic systems the bitmaps must be "ready to print" before the printing starts, or must be in such format that the bitmaps can be generated "on the fly", i.e. in real time with respect to the printing engine. A considerable amount of memory to store the bitmaps is thus necessary.

One system that reduces the size of the required memory with a factor of two, is disclosed in the European patent application 93202522.4 with priority date on Aug. 27th 1993 and titled: "High quality multilevel halftoning for colour images with reduced memory requirements". By transforming the contone levels to bitmap elements represented by 4 bits, the memory requirements can be reduced by a factor of two, without noticeable quality loss.

Another solution is incorporated in the Agfa Multistar 400 and 600 system. This system multiplexes different RIP (Raster Image Processor) outputs for one single recorder, for imaging the rasterized images on a photographic medium. The bitmaps for each colour component from the different RIP's are acquired, compressed by a lossless compression and temporarily stored on disk, along with a job list. The compression must be lossless, such that the bitmap information can be reconstructed exactly as it was generated, otherwise clearly visible artifacts would become apparent. By decompression of the data on disk, each bitmap is generated in bands, and each band is sent to the recorder. The drawback of a lossless compression is that the compression ratio ranges between a factor 1 and 8, but cannot be predicted accurately. If for example very complex halftone dot distributions are created by a high quality screening process, such as the Agfa CristalRaster (CristalRaster is a trade mark of Agfa-Gevaert N.V. in Mortsel, Belgium), it is even possible that the compressed bitmap is larger than the original bitmap. Moreover, the Agfa Multistar 400 and 600 cannot deliver the rasterized image data in real time to the recorder, which poses no problem for the photographic recorders, but is unacceptable for e.g. electrographic printers.

OBJECTS OF THE INVENTION

It is therefore a first object of the invention to provide a method that requires a substantial lower memory size, while keeping up with real time conditions of the printing device.

It is a further object of the invention to provide a method that doesn't deteriorate the quality of the reproduced images and graphics.

Other objects will become apparent from the description hereinafter.

SUMMARY OF THE INVENTION

In accordance with the present invention, a method is disclosed for generating regions of a rasterized image, described by digital input commands including:

first instructions to fill a first said region with a solid pattern, and second instructions to fill a second said region with a halftone screen pattern said method comprising the following steps converting said first instructions to a first internal representation by a first conversion;

converting said second instructions to a second internal representation by a second conversion;

storing said first and second internal representations retrieving said first and second stored internal representations;

combining said first and second retrieved internal representations for generating said regions.

A rasterized image can be a binary representation of the image to be printed on a binary output device, or any representation suitable for driving a multilevel output device, for which at every addressable location or recorder element, different grey shades can be rendered. In a rasterized image, every recorder element can be represented by one bit for a binary device, by two, four or eight bits for a multilevel device, or by any other amount of bits, normally limited by sixteen bits. For colour images, preferentially three or four rasterized images are generated, which are printed separately on different sheets or on top of each other, each in a different colour, such as cyan, magenta, yellow and black for the fourth component. Printing with more colour components is also supported by the method according to the current invention.

The digital input commands that describe the rasterized image can be for example PostScript commands (PostScript is a trade mark of Adobe Systems Inc.) or AgfaScript commands (AgfaScript is a trade mark of Agfa-Gevaert A.G. in Leverkusen, Germany), or any other digital commands coded in a PDL (Page Description Language), or commands for specifying graphics, characters and images for output on a sheet of paper or photographic film, or any other medium that can carry graphical and image objects.

The digital commands can represent graphics such as lines, arcs, curves, arrows, etc. or characters, or figures composed of those elements and contone images. Usually, graphics are represented on the reproduction in full black or white, or for colour outputs also full cyan, magenta, yellow, red, green or blue or any colour available by printing or overprinting full colour components. Such graphics can be identified as regions on the reproduction that are defined by an imaginary closed outline around the graphical element, which is filled with recorder elements getting all the same highest or lowest density. These regions will be visible on the reproduction as regions filled with a solid pattern.

It is also possible that the graphics must get a colour different from the above mentioned colours. In that case, said colour must be obtained by filling the imaginary closed outline by a screen pattern, such that the recorder elements within this region get different densities. In a binary output system, typically some recorder elements within the region will get a maximum density, while the remaining recorder elements within this region will get a minimum density. In multilevel output systems, all recorder elements could get the same intermediate density, but typically different densities will be present within the recorder elements of such region. The effect of an intermediate colour is thus obtained by a pattern, usually called a halftone screen pattern in analogy with photomechanical screening techniques, and for all types of bi-level and multilevel halftoning techniques.

If continuous tone images, in colour or black and white, must be reproduced by the output device, the intermediate tones are also obtained by halftone screen patterns. A region on the reproduction covered by a continuous tone image, will thus also give a region with a halftone screen pattern.

It is now advantageous to distinguish a first type of instructions that result in solid patterns on the reproduction from a second type of instructions that result in halftone screen patterns, and treat them separately. The first type of instructions can be converted to an internal representation. This representation can be a display list, describing all graphical objects as elementary trapezoids, and including references to character bitmaps for frequently used characters. This can be a very compact format, that requires a minimal amount of time to store the representation on a storage medium such as a hard disk and retrieve it from this storage medium. Moreover, the display list can in most cases be converted to bitmap format as fast as is necessary to keep up with the speed of the output device.

The first type of instructions can also—prior to storage on a storage medium—be converted to a bitmap and a bitmask at the resolution of the output device. The bitmap indicates whether the recorder element must get the highest or lowest possible density, while the bitmask indicates whether a solid pattern or a halftone screen pattern must be rendered at the corresponding recorder element. The bitmap and the bitmask can be stored in different memory locations, or in two consecutive bits—one for the bitmap and one for the bitmask—for each recorder element. The information stored in the memory locations are preferentially compressed by a lossless compression method, and stored on a storage medium, where the compressed data can be retrieved once all the digital input commands for one page are handled. Very efficient compression techniques exist for lossless compression of bitmaps representing graphical objects. The compressed data are then retrieved from the storage medium, decompressed to the identical format as before compression. As such, solid patterns will appear on the rasterized image at the highest possible resolution and without any quality loss. A lossless compression followed by the appropriate decompression has no effect on the original data. The intermediate compressed format however requires less storage space than the original data. The thus decompressed data are combined with the data that will be converted to a halftone screen pattern.

The second type of instructions on the other hand corresponds to continuous tone image or intermediate tone graphical information. A slight deterioration of the information contents is acceptable and will be hardly noticeable, because of the three following considerations:

the halftoning process, as will be discussed later, introduces an inevitable modification to the data;

the printing process, which is for example electrographical, introduces on its own some modifications;

the human eye is not capable to see small density variations over a small distance: those small variations will usually be integrated.

Therefore, this type of data can be represented preferentially in contone format, e.g. by eight bits per pixel. This representation is called a contone map. The contone map is preferentially compressed by a lossy compression method. A lossy compression method on contone data can give a considerable reduction factor without noticeable quality loss. Mostly there is a trade off between reduction factor and quality loss. It has been established that a reduction factor of eight, results in an acceptable quality reduction. It is also advantageous to perform the compression on the contone data, rather than on halftoned data, because most lossy compression methods give a better compression ratio for rather continuous data. The resulting compressed data are stored in a storage medium, and retrieved from the storage medium and decompressed after all digital input commands for one page are completely handled. The decompression gives again a contone map, which is an approximation of the original contone map, due to the lossy compression technique. The approximating contone map can then be halftoned in order to give a data value for each recorder element. The aforementioned bitmask indicates whether the halftoned data value or the bitmap value must be applied to the corresponding recorder element.

DETAILED DESCRIPTION OF THE INVENTION

Figure 1:
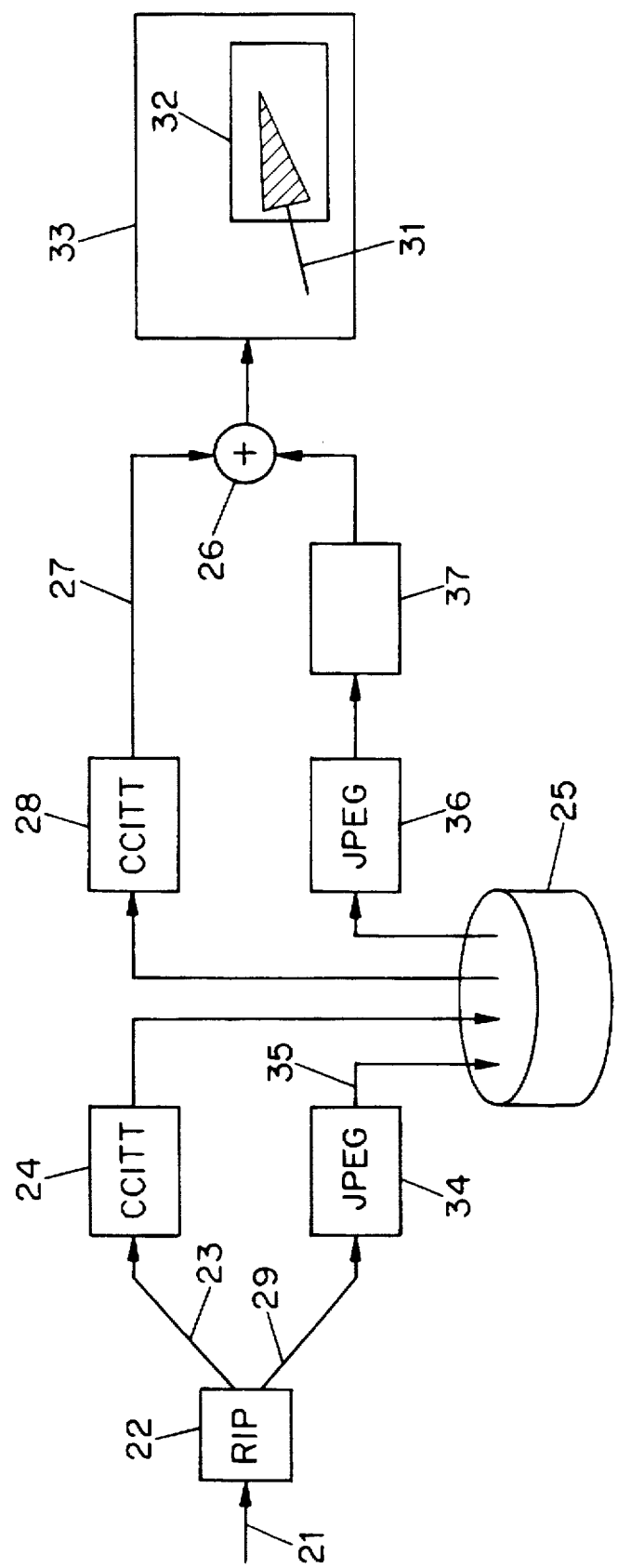

The invention is described hereinafter by way of example with reference to the accompanying figure wherein: FIG. 1 shows a specific embodiment for carrying out the method according to the current invention.

FIG. 1 shows a Raster Image Processor RIP 22, which is fed by digital input commands 21. These digital input commands can be for example PostScript commands specifying a black rectangle, a greyish square and a rectangular continuous tone image. Such commands can be generated by an interactive drawing program running on a personal computer, such as for example Freelance (Freelance is a trade mark of Lotus Development Corporation), or by electronic pre-press systems. Some of these commands can describe images. The data for such image commands can be generated by a scanning device, such as the Horizon Plus colour scanner (Horizon Plus is a trade mark of Agfa-Gevaert N.V.), marketed by Agfa-Gevaert N.V. in Mortsel, Belgium. The scanning device scans for example a continuous tone image on photographic paper. Graphical and text information in the page description language commands, are usually introduced by human interaction on the electronic pre-press system. The page description lange commands or digital input commands are converted to a rasterized image representation, which signals are used to drive e.g. an electrographic printer system, that prints the representation on paper with e.g. black toner. The raster image processor 22 classifies the digital input command for the black rectangle in a first set 23 of instructions for solid patterns, and classifies the digital input commands for the greyish square and the rectangular continuous tone image in a second set 29 of instructions for halftone screen patterns. The first set of instructions is converted to a display list. This is usually a list of internal commands, generated from the digital input commands, specifying trapezoids, having two horizontal sides, to be filled by a specific colour. Because the raster image processor 22 already selected the digital input commands resulting in solid patterns only, the specific colour can be only dark or light. For black ink, dark corresponds with black, while light corresponds with white. For other ink colours, dark and light correspond to the colours when full or no ink is applied.

Once the display list has been generated, the system can determine from the elements in the display list whether a bitmap can be generated from it at a speed keeping up with the speed by which the output device requires the bitmap. If this is possible, the display list can preferentially be stored in its internal representation format on the storage medium 25. Usually the description of a page by a display list is shorter than the description by a bitmap, requiring one bit per recorder element. It is also advantageous to compress the display list information. The compression technique must be completely reversible or lossless, which means that after decompression exactly the same data are retrieved that were compressed.

If the display list is too lengthy, or takes too much time to be generated at the required speed, the expansion of the display list to a bitmap is necessary before storing on the storage medium 25. The bitmap must represent the colour, light or dark, in which the object must be represented. This can be represented by one bit per recorder element. On the other hand, at the combination process 26, we need also to know where the bitmap information 27 must be introduced in the rasterized image 33. Therefore, along with a bitmap, a bitmask must be generated. This bitmask indicates for every recorder element whether the recorder element belongs to a region with a solid pattern or belongs to a region with a halftone screen pattern. Also for the bitmask one bit per recorder element is sufficient. The bitmap and bitmask bits for one recorder element can be combined in two consecutive bits. It is even possible to combine the bitmap and bitmask information for five recorder elements in one byte of eight bits, because bitmap and bitmask together need to reflect only three states:

the recorder element is solid light the recorder element is solid dark the recorder element is halftone screened Five recorder elements require $3^5=243$ states, which can be represented by eight bits, having 256 states.

The bitmap and bitmask separately or combined are preferentially compressed by a lossless compression technique, such as the group 3 CCITT recommendation T.4 compression. Alternatively, the group 4 CCITT recommendation T.4 compression technique can be used to achieve the compression.

The first conversion 24 for the first type of instructions can thus be alternatively done by generation of a display list, which can be compressed, or by the generation of a bitmap and bitmask, which are preferentially compressed. Bitmap and bitmask are preferentially generated sequentially in bands, saving storage necessary to store the full bitmap otherwise. Therefore, the display list can be executed for example with different bounding boxes, clipping everything outside the bounding box. First all digital input commands for the whole rasterized image are converted to the display list describing the solid pattern regions. If this display list is too long to be stored in random access memory, it can temporarily be saved on another storage medium 25, such as a hard disk. After the display list is generated, a rectangular window, corresponding to a reduced amount of full lines in the rasterized image, is established. The display list is traversed, and all recorder elements within the rectangular window, which are affected by the internal commands within the display list, are handled in the bitmap and bitmask band corresponding to the rectangular window. Once the whole display list is traversed, the bitmap and bitmask band can be lossless compressed and stored on the storage medium 25.

Alternatively, it is also possible to inspect per thus established rectangular window whether the affecting display list commands are "complex", i.e. whether the generation of a bitmap from these commands requires more computation time than available due to the real-time printing process. For rectangular windows having "complex" display list commands, preferentially a bitmap and bitmask are generated and stored after compression. For the other rectangular windows, it is advantageous to postpone the generation of the bitmap until the solid patterns must be combined with the halftone screen patterns, in combination circuit 26. The storage of the band affecting commands in the display list usually requires less memory than the storage of the bitmap and bitmask band. For these rectangular windows, the affecting display list commands can be stored in storage medium 25, possibly after lossless compression.

The first internal representation, stored in storage medium 25, is retrieved once all the digital input commands describing one page are processed. At that moment, the first internal representation is retrieved from the storage medium 25, and converted to a bitmap and bitmask at the resolution of the output device, i.e. for every recorder element addressable by the output device, one bit in the bitmap is generated indicating whether the corresponding recorder element must be rendered fully dark or fully light; and one bit in the bitmask is generated indicating whether the corresponding recorder element must be rendered as belonging to a solid region or as belonging to a halftone screen pattern region. From the bitmap and bitmask, together with the contone map which will be discussed below, the elements—each corresponding to one recorder element—for the rasterized image are generated. If the bitmask indicates that the corresponding recorder element belongs to a halftone screen region, then the bitmap information is discarded, but the contone map information, as will be discussed below, is used to establish the value for the corresponding rasterized image element. The bitmap and bitmask are generated by the solid region retrieve unit 28. In the case that the full bitmap and bitmask or bands of them were stored in compressed format on the storage medium 25, the solid region retrieve unit will perform a decompression, matching the compression done in the first conversion unit 24, delivering a bitmap and bitmask identical to the one before compression. If the first internal representation comprises display list commands, these commands are converted to the corresponding bitmap and bitmask in the solid region retrieve unit 28. Preferentially, the solid region retrieve unit generates the bitmap and bitmask in bands, which are passed to the combination circuit 26 to generate the rasterized image 33. As soon as a bitmap and bitmask band is passed to the combination circuit, the solid region retrieve unit retrieves the information concerning the next band from the storage medium 25.

The second type of instructions 29 from the digital input commands 21 corresponding to halftone screen pattern regions 32 are converted to a second internal representation by a second conversion unit 34. The second internal representation is stored in a storage medium 25, and retrieved once all digital input commands 21 describing the full rasterized image 33 are converted and stored on the storage medium 25. The retrieved internal representations are then combined with the bitmap and bitmask signals 27 in the combination circuit 26, to generate the rasterized image elements 33. The screening process, necessary for the representation of continuous tone values, is preferentially postponed until the moment that the combination with the solid areas must occur.

Preferentially, the second conversion unit 34 generates a contone map. A contone map is a representation of an image with varying densities at every location by more than two states per image location or pixel. Usually every pixel in a contone map is represented by a grey scale number ranging from 0 to 255, being stored in a byte of eight bits. With every pixel in the contone map corresponds a rectangular area on the reproduction that must get a density that is close to the grey value represented by the pixel value. The orientation of the rectangular area is preferentially parallel to the main orientation of the rasterized image. It is possible however that the digital input commands deliver the image pixels with an orientation not parallel to the rasterized image. Therefore, the second transformation unit will resample the image by techniques known in the art to give the pixels in the contone map the correct orientation. Such techniques include nearest neighbour resampling or replication, linear or bilinear interpolation, cubic spline, bell spline or Hanning function convolution etc. The size of the rectangular area represented by the contone map pixel on the reproduction can also freely be chosen for most resampling techniques. To reduce memory requirements, it is advantageous to make the size of the rectangular area not smaller than the size of a recorder element, i.e. the resolution of the contone map is not higher than the resolution of the recorder, which is the resolution required for the rasterized image 33. As will be described below, contone map values must be screened in order to fit for the rasterized image. A screening method has a screen ruling, which can be derived for dot size modulated clustered dot screening methods from the shortest distance between two halftone dot centers. According to the Nyquist sampling theorem, the resolution for the contone map is preferentially set two times higher than the screen ruling, in order to render the highest possible detail from the original image defined by the digital input commands. If a continuous tone image—e.g. on photographic paper—is sampled by e.g. a scanner to convert it to digital image signals, then the highest frequency in the continuous tone image that can be reconstructed from the digital image signals is a half of the spatial sampling resolution. On the other hand, if the contone image is reproduced from the digital image signals, using a periodical screen having screen ruling $F_R$, then the reproduction will render those spatial frequencies, which are lower than the screen ruling. Otherwise, subject moire will result. Thus the contone resolution is preferentially not higher than two times the screen ruling. If the resolution for the contone map is chosen higher than two times the screen ruling, the resolution is preferentially not higher than the recorder element resolution. If for example the recorder resolution is 600 dots per inch, a suitable screening technique for a multilevel system with sixteen different levels, has a screen ruling of 200 lines per inch. Preferentially, the contone map is then generated at a resolution of 400 pixels per inch.

The thus obtained contone map can now be compressed by the second conversion unit 34. A lossy compression technique is acceptable here, for the three reasons discussed before. By this compression, a compressed contone map 35 is obtained. In a preferred embodiment, a JPEG (Joint Photographic Experts Group) lossy compression standard method defined by the CCITT and ISO groups can be used. We use this method preferentially with a compression factor of 8. Typically square regions consisting of eight by eight contone map pixels are compressed to a few numbers obtained by techniques including a discrete cosine transformation. Preferentially the generation of the contone map is done in bands containing an integer multiple of 8 lines, such that the 8×8 blocks fit in optimally.

If the images occupy small rectangular separated portions of the rasterized image, it is advantageous to generate for each image the required portion in a contone map format. The different contone maps can then be separately compressed and combined during the screening process, as described further down. If the images are that small that they can be stored fast enough and retrieved and occupy no more space than available for them in the system, they can be stored without compression.

The compressed contone map is then stored on the storage medium 25, and retrieved by the screened region retrieve unit 36. The first operation in this unit is the decompression of the compressed data to an approximating contone map. Due to the lossy compression in the second conversion unit 34, the approximating contone map will usually be different from the original contone map, that was compressed by lossy compression. The amount of pixels and thus also the resolution of the approximating contone map matches the original contone map. This is also the case for the number grey levels represented by each pixel. If the original contone can be represented by eight bits per pixels, then also the approximating contone map requires eight bits per pixel. To convert the approximating contone map to a rasterized image representation, in most cases a screening must be performed. This is done in the screening unit 37. Suitable screening methods are described in U.S. Pat. No 4,004,079, U.S. Pat. No. 4,350,996, U.S. Pat. No. 4,419,690, U.S. Pat. No. 4,443,060, U.S. Pat. No. 4,456,924, U.S. Pat. No. 4,485,397, U.S. Pat. No. 4,499,489, U.S. Pat. No. 4,537,470, U.S. Pat. No. 4,700,235, U.S. Pat. No. 4,918,622, U.S. Pat. No. 4,924,301, U.S. Pat. No. 5,111,310, U.S. Pat. No. 5,150,428, U.S. Pat. No. 5,155,599, U.S. Pat. No. 5,258,850, WO 90/04898, EP 501,126, EP 578 110, DE 29,31,092, and in Bayer, B. E., "An Optimum Method for Two-level Rendition of Continuous-tone Pictures", Proc. IEEE International Conference on Communications, Conference Record, pp. (26-11) to (26-15), 1973. The output of the screening process 37, is combined as described above by the combination circuit 26 to generate the rasterized image. Usually, together with the screening, a scaling of the approximating contone map to the device resolution is necessary. According to the above example, where the contone map was generated at a resolution of 400 pixels per inch, and the recorder resolution is 600 dots per inch, the screening operation must scale each pixel by a linear factor of 1.5.

According to the method of the current invention, we can compute how much bits on average are required to represent one recorder element for a worst case situation. We suppose that a bitmap and bitmask must be generated, which have a worst case compression factor of 1, and which require thus one bit each per recorder element. On the other hand, a full contone map must be generated, at a resolution of 400 pixels per inch, where the recorder resolution is 600 dots per inch. This gives already a reduction factor of 1.5*1.5=2.25. The JPEG compression ratio is 8, such that each pixel in the contone map, requiring eight bits, requires one bit on the average. Thus each recorder element requires 1/2.25=0.44 bits. The worst case situation thus requires 2.44 bits per recorder element. In a multilevel system, requiring 4 bits per recorder element, this is a saving with a factor of 1.6.

If a colour reproduction must be generated by the output device, one rasterized image 33 must be generated per colour component. In that case, the above described process is done for each colour component. In one specific embodiment, for the generation of a cyan, magenta and yellow rasterized image, a separate bitmap, bitmask and contone map are generated for cyan, magenta and yellow. The bitmap and bitmask for each colour component are lossless compressed, stored, retrieved, decompressed and combined with the screened approximating contone map for each colour component separately. The contone map for each colour component is lossy compressed, stored, retrieved, decompressed and screened. The screened data are combined with the bitmap according to the information in the bitmask of the corresponding colour component.

Different steps of the above sketched method can be performed in parallel on a multi processor circuit. A suitable system is the Texas Instruments MVP (Multimedia Video Processor) TMS 320C80. One processor can decompress the bitmap, another one the bitmask, another one the contone map, another can perform the screening operation and a last one can do the combination of the bitmap with the screened approximating contone map based on the information in the bitmask. No specific hardware for performing compression or decompression is required.

The method can alternatively be realised by a device comprising CCITT and JPEG compression and decompression hardware components, along with glue logic and a general purpose processor such as a power PC performing the translation of the digital input commands and another general purpose processor performing the screening operation.

A third way to realise the method according to the current invention comprises the use of Arcobel's graphics processor "Imagine", for which the graphical accelerators or pipe-line processors are freely configurable to implement the methods described above.

Although the present invention has been described with reference to preferred embodiments, those skilled in the art will recognise that changes may be made in form and detail without departing from the spirit and scope of the invention.

I claim:

1. A method for generating regions of a rasterized image, described by digital input commands including:

first instructions to fill a first said region with a solid pattern, and second instructions to fill a second said region with a halftone screen pattern; said method comprising the following steps:

converting said first instructions to a first internal representation by a first conversion;

converting said second instructions to a second internal representation by a second conversion;

storing said first and second internal representations;

retrieving said first and second stored internal representations;

combining said first and second retrieved internal representations for generating said regions.

* * * * *